(12) United States Patent
Koga et al.

(10) Patent No.: US 9,515,315 B2
(45) Date of Patent: Dec. 6, 2016

(54) POSITIVE ELECTRODE ACTIVE SUBSTANCE PARTICLES FOR NON-AQUEOUS ELECTROLYTE SECONDARY BATTERIES AND PROCESS FOR PRODUCING THE SAME, AND NON-AQUEOUS ELECTROLYTE SECONDARY BATTERY

(71) Applicant: TODA KOGYO CORP., Hiroshima-ken (JP)

(72) Inventors: Kazumichi Koga, Yamaguchi-ken (JP); Ryuta Masaki, Yamaguchi-ken (JP); Akihisa Kajiyama, Yamaguchi-ken (JP); Hiroaki Masukuni, Yamaguchi-ken (JP)

(73) Assignee: TODA KOGYO CORP., Hiroshima (JP)

( * ) Notice: Subject to any disclaimer, the term of this patent is extended or adjusted under 35 U.S.C. 154(b) by 180 days.

(21) Appl. No.: 14/380,523

(22) PCT Filed: Feb. 22, 2013

(86) PCT No.: PCT/JP2013/054462
§ 371 (c)(1),
(2) Date: Aug. 22, 2014

(87) PCT Pub. No.: WO2013/125668
PCT Pub. Date: Aug. 29, 2013

(65) Prior Publication Data
US 2015/0037677 A1 Feb. 5, 2015

(30) Foreign Application Priority Data

Feb. 23, 2012 (JP) .................................. 2012-037134

(51) Int. Cl.
*H01M 4/36* (2006.01)
*H01M 10/0525* (2010.01)
(Continued)

(52) U.S. Cl.
CPC .............. *H01M 4/364* (2013.01); *C01G 25/00* (2013.01); *H01M 4/485* (2013.01); *H01M 4/502* (2013.01);
(Continued)

(58) Field of Classification Search
CPC combination set(s) only.
See application file for complete search history.

(56) References Cited

U.S. PATENT DOCUMENTS

| | | |
|---|---|---|
| 6,878,490 B2 | 4/2005 | Gao et al. |
| 2002/0141937 A1 | 10/2002 | Howard et al. |

(Continued)

FOREIGN PATENT DOCUMENTS

| | | |
|---|---|---|
| EP | 2 228 863 | 9/2010 |
| EP | 2 698 351 | 2/2014 |

(Continued)

OTHER PUBLICATIONS

Federal Register, vol. 76, No. 27, pp. 7162-7175, issued Feb. 9, 2011 which details Supplementary Examination Guidelines for Determining Compliance with 35 U.S.C. 112 and for Treatment of Related Issues in Patent Applications.*

(Continued)

*Primary Examiner* — Ula C Ruddock
*Assistant Examiner* — Amanda Barrow
(74) *Attorney, Agent, or Firm* — Nixon & Vanderhye P.C.

(57) ABSTRACT

The present invention relates to positive electrode active substance particles for non-aqueous electrolyte secondary batteries, comprising an oxide having a spinel structure and comprising at least Li and Mn as main components and an (Continued)

oxide comprising at least Li and Zr, in which the oxide comprising at least Li and Zr forms a mixed phase comprising two or more phases, and a content of the oxide comprising at least Li and Zr in the positive electrode active substance particles is 0.1 to 4% by weight. The present invention provides positive electrode active substance particles for non-aqueous electrolyte secondary batteries which are excellent in high-temperature characteristics and a process for producing the positive electrode active substance particles, and a non-aqueous electrolyte secondary battery.

4 Claims, 2 Drawing Sheets (51) Int. Cl.
H01M 4/50 (2010.01)
C01G 25/00 (2006.01)
H01M 4/505 (2010.01)
H01M 4/485 (2010.01)
H01M 8/04 (2016.01)

(52) U.S. Cl.
CPC ......... H01M 4/505 (2013.01); H01M 10/0525 (2013.01); *C01P 2002/32* (2013.01); *C01P 2002/72* (2013.01); *C01P 2004/03* (2013.01); *C01P 2004/62* (2013.01); *H01M 8/04671* (2013.01); *H01M 2220/30* (2013.01); *Y02E 60/122* (2013.01); *Y02P 70/54* (2015.11)

(56) References Cited

U.S. PATENT DOCUMENTS

| | | |
|---|---|---|
| 2003/0035999 A1 | 2/2003 | Gao et al. |
| 2007/0212607 A1 | 9/2007 | Fujihara et al. |
| 2009/0017384 A1 | 1/2009 | Iwasaki et al. |
| 2009/0155694 A1 | 6/2009 | Park |
| 2010/0261069 A1 | 10/2010 | Nakura |
| 2011/0086274 A1* | 4/2011 | Chang ............... H01M 4/505 429/223 |
| 2012/0003540 A1* | 1/2012 | Nakano ............... C01B 25/45 429/221 |
| 2013/0017449 A1 | 1/2013 | Yasuda et al. |
| 2014/0087262 A1 | 3/2014 | Imahashi et al. |

FOREIGN PATENT DOCUMENTS

| | | |
|---|---|---|
| JP | 2005-502161 | 1/2005 |
| JP | 2006-202702 | 8/2006 |
| JP | 2007-273448 | 10/2007 |
| JP | 2009-152197 | 7/2009 |
| JP | 2011-113885 | 6/2011 |
| JP | 2011-233234 | 11/2011 |

OTHER PUBLICATIONS

Ni et al., Improved electrochemical performance of layered LiNi0.4CoO.2Mn0.4O2 via Li2ZrO3 coating, Electrochemica Acta, 53 (2008), 3075-3083, available online Nov. 19, 2007.*
Thackeray et al, "ZrO2—and Li2ZrO3—stabilized spinel and layered electrodes for lithium batteries," Electrochemistry Communications 5 (2003) 752-758, Available online Aug. 9, 2003.*
English language version of International Preliminary Report on Patentability in PCT/JP2013/054462 dated Sep. 4, 2014.
Extended European Search Report issued in Application No. 13752038.3 dated Sep. 22, 2015.
Lin et al., "Enhanced High-Rate Cycling Stability of LIMn$_2$O$_4$ Cathode by ZrO$_2$ Coating for Li-Ion Battery," *Journal of the Electrochemical Society*, 2005, vol. 152, No. 8, pp. A1526-A1532.
International Search Report for PCT/JP2013/054462 mailed Apr. 9, 2013.
M. M. Thackeray et al., "ZrO2—and Li$_2$ZrO$_3$—Stabilized Spinel and Layered Electrodes for Lithium Batteries", Electrochemistry Communications, 2003, 5, pp. 752-758.
Thackeray et al, "ZrO$_2$- and Li$_2$ZrO$_3$-stabilized spinal and layered electrodes for lithium batteries", Electrochemistry Communications, 5 (2003) 752-758.
Extended European Search Resort issued in Application No. 13760854.3 dated Sep. 24, 2015.
International Search Report for PCT/JP2013/057150, mailed Apr. 16, 2013.
U.S. Office Action issued in U.S. Appl. No. 14/384,784, dated Apr. 22, 2016. (1417-887).

* cited by examiner

POSITIVE ELECTRODE ACTIVE SUBSTANCE PARTICLES FOR NON-AQUEOUS ELECTROLYTE SECONDARY BATTERIES AND PROCESS FOR PRODUCING THE SAME, AND NON-AQUEOUS ELECTROLYTE SECONDARY BATTERY

This application is the U.S. national phase of International Application No. PCT/JP2013/054462 filed 22 Feb. 2013 which designated the U.S. and claims priority to JP 2012-37134 filed 23 Feb. 2012, the entire contents of each of which are hereby incorporated by reference.

TECHNICAL FIELD

The present invention relates to positive electrode active substance particles for non-aqueous electrolyte secondary batteries, and more particularly, to positive electrode active substance particles for non-aqueous electrolyte secondary batteries which comprise lithium manganate particles and are capable of exhibiting a high output and an excellent high-temperature stability.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Under these circumstances, lithium ion secondary batteries having advantages such as a high charge/discharge voltage and a large charge/discharge capacity have been noticed.

Hitherto, as positive electrode active substances useful for high energy-type lithium ion secondary batteries exhibiting a 4 V-grade voltage, there are generally known $LiMn_2O_4$ having a spinel structure and $LiMnO_2$, $LiCoO_2$, $LiCo_{1-x}Ni_xO_2$ and $LiNiO_2$ having a rock-salt type structure, or the like. Among these positive electrode active substances, $LiCoO_2$ is more excellent because of a high voltage and a high capacity thereof, but has the problems such as a high production cost due to a less amount of a cobalt raw material supplied, and a poor environmental safety upon disposal of batteries obtained therefrom. In consequence, there have now been made earnest studies on lithium manganate particles with a spinel type structure (basic composition: $LiMn_2O_4$; hereinafter defined in the same way) which are produced by using, as a raw material, manganese having a large supply amount, a low cost and a good environmental compatibility.

As is known in the art, the lithium manganate particles having a spinel structure may be obtained by mixing a manganese compound and a lithium compound at a predetermined ratio and then calcining the resulting mixture at a temperature of 700 to 1000° C.

When using the lithium manganate particles as a positive electrode active substance for lithium ion secondary batteries, there tends to arise such a problem that the resulting battery has a high voltage and a high energy density, but tends to be deteriorated in charge/discharge cycle characteristics. The reason therefor is considered to be that when charge/discharge cycles are repeated, the crystal lattice is expanded and contracted owing to desorption and insertion behavior of lithium ions in the crystal structure to cause change in volume of the crystal, which results in occurrence of breakage of the crystal lattice or dissolution of manganese in an electrolyte solution.

At present, in the lithium ion secondary batteries using lithium manganate particles, it has been strongly required to suppress deterioration in charge/discharge capacity due to repeated charge/discharge cycles, and improve the charge/discharge cycle characteristics, in particular, under high-temperature and low-temperature conditions.

In order to improve the charge/discharge cycle characteristics of the batteries, it is required that the positive electrode active substance used therein which comprises the lithium manganate particles has an excellent packing property and an appropriate size, and further is free from elution of manganese therefrom. To meet the requirements, there have been proposed the method of suitably controlling a particle size and a particle size distribution of the lithium manganate particles; the method of obtaining the lithium manganate particles having a high crystallinity by controlling a calcination temperature thereof; the method of adding different kinds of elements to the lithium manganate particles to strengthen a bonding force of the crystals; the method of subjecting the lithium manganate particles to surface treatment or adding additives thereto to suppress elution of manganese therefrom; or the like.

Conventionally, it is known that aluminum is incorporated in the lithium manganate particles (Patent literature 1). In addition, it is known that a sintering aid such as boron oxide, boric acid, lithium borate and ammonium borate is added upon production of lithium manganate to attain effects by addition of the sintering aid (Patent literature 2). Further, it is known that a content of sulfur in lithium manganate is reduced (Patent literature 3).

In addition, various attempts have been made to improve properties of lithium manganate by using a Zr oxide as an additive or a coating agent. For example, there is described a method in which $Li_2ZrO_3$ is formed on a surface layer of respective lithium manganate particles like a core/shell structure to improve properties thereof (Patent Literature 4). Also, it is described that a sheet-like material comprising $Li_2ZrO_3$ is incorporated as a gas adsorbent into a battery to suppress generation of gases therein (Patent Literature 5).

CITATION LIST

Patent Literature

Patent literature 1: Japanese Patent Application Laid-Open (KOKAI) No. 2001-146425
Patent literature 2: Japanese Patent Application Laid-Open (KOKAI) No. 2001-48547
Patent literature 3: Japanese Patent Application Laid-Open (KOKAI) No. 2002-198047
Patent Literature 4: Published Japanese Translation of International Patent Application (KOHYO) No. 2004-536420
Patent literature 5: Japanese Patent Application Laid-Open (KOKAI) No. 2004-152619

SUMMARY OF INVENTION

Problem to be Solved by the Invention

At present, it has been strongly required to provide a material as a positive electrode active substance for non-aqueous electrolyte secondary batteries which is capable of improving output characteristics and high-temperature characteristics of the non-aqueous electrolyte secondary batteries. However, the material capable of fully satisfying these requirements has not been obtained until now.

That is, in the above Patent literatures 1 to 3, there are respectively described the lithium manganate comprising an Al element with which a part of manganese as a metal element therein is substituted, the lithium manganate to which a small amount of a sintering aid is added, and the lithium manganate whose sulfur content is reduced. However, these lithium manganates have failed to provide batteries capable of exhibiting satisfactory high-temperature characteristics and, therefore, tend to be insufficient for practical use.

Also, in the above Patent literature 4, it is described that $Li_2ZrO_3$ is coated on a surface layer of respective lithium manganate particles like a core/shell structure. However, in the method described in the Patent literature 4, Li in the $Li_2ZrO_3$ is incorporated into the lithium manganate structure having a spinel structure to thereby form $ZrO_2$. In addition, the transport number of Li ions tends to be deteriorated, thereby failing to attain a necessary rate characteristic of the resulting secondary battery. Further, in the above Patent literature 5, although the effects of absorbing and suppressing gases generated within the battery are described, there is no description concerning improvement in battery characteristics.

In consequence, an object or technical task of the present invention is to provide positive electrode active substance particles for non-aqueous electrolyte secondary batteries which are excellent in high-temperature characteristic and a process for producing the positive electrode active substance particles, and a non-aqueous electrolyte secondary batter.

Mean for Solving the Problem

The above problem and technical task of the present invention can be solved and accomplished by the following aspects of the present invention.

That is, according to the present invention, there are provided positive electrode active substance particles for non-aqueous electrolyte secondary batteries, comprising an oxide having a spinel structure and comprising at least Li and Mn as main components and an oxide comprising at least Li and Zr, in which the oxide comprising at least Li and Zr forms a mixed phase comprising two or more phases, and a content of the oxide comprising at least Li and Zr in the positive electrode active substance particles is 0.1 to 4% by weight (Invention 1).

Also, according to the present invention, there are provided the positive electrode active substance particles for non-aqueous electrolyte secondary batteries as described in the above Invention 1, wherein the oxide comprising at least Li and Zr comprises $Li_2ZrO_3$ as a main phase which forms a mixed phase with at least one other phase selected from the group consisting of $Li_4ZrO_4$, $Li_6Zr_2O_7$ and $Li_8ZrO_6$, and a ratio of the main phase to the at least one other phase in the mixed phase is 99:1 to 92:8 (Invention 2).

Also, according to the present invention, there are provided the positive electrode active substance particles for non-aqueous electrolyte secondary batteries as described in the above Invention 1 or 2, wherein the oxide comprising at least Li and Zr has a crystallite size of 100 to 600 nm (Invention 3).

Also, according to the present invention, there are provided the positive electrode active substance particles for non-aqueous electrolyte secondary batteries as described in any one of the above Inventions 1 to 3, wherein in a secondary battery produced using the positive electrode active substance particles for non-aqueous electrolyte secondary batteries as a positive electrode and metallic lithium as a counter electrode, an improvement rate of a rate characteristic thereof is not less than 10, and an improvement rate of a cycle characteristic thereof is not less than 10 (Invention 4).

In addition, according to the present invention, there is provided a process for producing the positive electrode active substance particles for non-aqueous electrolyte secondary batteries as described in any one of the above Inventions 1 to 4, comprising the steps of:

mixing a lithium/manganese composite oxide having a spinel structure and comprising at least Li and Mn as main components with 0.1 to 4% by weight of an oxide comprising at least Li and Zr (Invention 5).

Further, according to the present invention, there is provided a non-aqueous electrolyte secondary battery using the positive electrode active substance particles for non-aqueous electrolyte secondary batteries as described in any one of the above Inventions 1 to 4 (Invention 6).

Effect of the Invention

The positive electrode active substance particles for non-aqueous electrolyte secondary batteries according to the present invention can exhibit a high output and an excellent high-temperature stability, and therefore can be suitably used as a positive electrode active substance for non-aqueous electrolyte secondary batteries.

PREFERRED EMBODIMENTS FOR CARRYING OUT THE INVENTION

The construction of the present invention is described in more detail below.

First, the positive electrode active substance particles for non-aqueous electrolyte secondary batteries according to the present invention are described.

The positive electrode active substance particles according to the present invention are constituted of an oxide having a spinel structure and comprising at least Li and Mn as main components, and an oxide comprising at least Li and Zr. Meanwhile, the "oxide comprising at least Li and Zr" as used herein means a composite oxide comprising at least Li and Zr, and the phrase "at least" may be occasionally omitted.

As the oxide having a spinel structure and comprising at least Li and Mn as main components, there may be mentioned, for example, lithium manganate and nickel-substituted lithium manganate that is operated as a battery in a 5 V region. Mn in the lithium manganate used in the present invention may be partially substituted with a transition metal. In addition, starting materials of the lithium manganate and production methods thereof are not particularly limited unless any different phases are observed in an XRD diffraction pattern thereof.

The oxide comprising at least Li and Zr used in the present invention forms a mixed phase having two or more phases when identified by XRD diffraction. The main phase of the mixed phase is $Li_2ZrO_3$, and the other phases of the mixed phase except for the main phase include, for example, $Li_4ZrO_4$, $Li_6Zr_2O_7$ and $Li_8ZrO_6$. In the present invention, of these other phases, preferred is $Li_6Zr_2O_7$.

The content of the oxide comprising Li and Zr in the positive electrode active substance particles for non-aqueous electrolyte secondary batteries according to the present invention is 0.1 to 4.0% by weight. When the content of the oxide comprising Li and Zr in the positive electrode active substance particles for non-aqueous electrolyte secondary batteries is less than 0.1% by weight, no effect of addition thereof, i.e., no effect of improving an output characteristic or a cycle characteristic among battery characteristics, tends to be attained. When the content of the oxide comprising Li and Zr in the positive electrode active substance particles for non-aqueous electrolyte secondary batteries is more than 4.0% by weight, the battery characteristics tend to be deteriorated, and the amount of Mn eluted tends to be increased. The content of the oxide comprising Li and Zr in the positive electrode active substance particles for non-aqueous electrolyte secondary batteries is preferably 0.5 to 3.5% by weight.

Also, the ratio of $Li_2ZrO_3$ as a main phase of the oxide comprising Li and Zr according to the present invention to the other phases than the main phase which are present in the oxide comprising Li and Zr is preferably 99:1 to 92:8. When the ratio of $Li_2ZrO_3$ to the other phases is out of the above-specified range, the battery characteristics tend to be deteriorated. The ratio of $Li_2ZrO_3$ to the other phases is more preferably 99:1 to 94:6, and still more preferably 99:1 to 96:4.

The crystallite size of the oxide comprising Li and Zr according to the present invention is preferably 100 to 600 nm. When the crystallite size of the oxide comprising Li and Zr is less than 100 nm, different phases other than the oxide comprising Li and Zr tend to be generated therein, and therefore the resulting particles tend to be deteriorated in properties thereof. When the crystallite size of the oxide comprising Li and Zr is more than 600 nm, the effect of improving properties of the particles by addition of the oxide comprising Li and Zr tends to be reduced. The crystallite size of the oxide comprising Li and Zr is more preferably 200 to 600 nm.

In general, it is known that $ZrO_2$ is enhanced in electron conductivity owing to electron hoppling caused by propagation of electrons through holes at a high temperature. It is considered by the inventors that the oxide of Li and Zr induces the electron hopping at room temperature. For this reason, it is considered that the positive electrode active substance particles for non-aqueous electrolyte secondary batteries according to the present invention in which the oxide of Li and Zr is present in the range defined by the present invention are capable of enhancing an electron conductivity as a battery.

In addition, it has been found that it is not necessary that the oxide of Li and Zr according to the present invention is present in a core/shell form or in an island form in the positive electrode active substance particles for non-aqueous electrolyte secondary batteries. This shows the results that are quite contrary to the description of the above Patent Literature 4. More specifically, in the present invention, the oxide having a spinel structure and comprising at least Li and Mn as main components and the oxide of Li and Zr are constituted of independent particles that are different in particle diameter from each other, and are simply mixed with each other to form the positive electrode active substance particles. As a result of the present inventors' earnest study, it has been found that it is important in the present invention that the oxide of Li and Zr forms such a mixed phase as defined by the range of the present invention, has such a crystallite size as defined by the present invention, and is present in a predetermined ratio in the positive electrode active substance particles.

When the average particle diameter D50 of the positive electrode active substance particles according to the present invention is less than 2 μm, the resulting positive electrode active substance particles tend to have an excessively large contact area with an electrolyte solution, and therefore tends to have an excessively high reactivity with the electrolyte solution, so that the resulting battery tends to be deteriorated in stability upon charging. When the average particle diameter D50 of the positive electrode active substance particles is more than 20 μm, the obtained electrode tends to have an increased resistance therein, and therefore the resulting battery tends to be deteriorated charge/discharge rate characteristics.

Next, the process for producing the positive electrode active substance particles is described.

The positive electrode active substance particles for non-aqueous electrolyte secondary batteries according to the present invention can be produced by mixing the oxide having a spinel structure and comprising at least Li and Mn as main components with 0.1 to 4% by weight of the oxide comprising at least Li and Zr.

The method of producing the oxide having a spinel structure and comprising at least Li and Mn as main components is not particularly limited. For example, a manganese raw material and a lithium raw material, if required together with other raw materials comprising different kinds of elements, are mixed with each other at predetermined molar ratios, and the resulting mixture is subjected to calcination at a temperature of 750 to 1000° C. The average particle diameter D50 of the oxide having a spinel structure and comprising at least Li and Mn as main components is usually 2 to 20 μm, and preferably 3 to 18 μm.

The method of producing the oxide comprising at least Li and Zr is not particularly limited. Examples of a Li compound used in the method include lithium carbonate, lithium nitrate, lithium acetate, lithium oxide and Li hydroxide. Examples of a Zr compound used in the method include zirconium oxide, zirconium hydroxide and zirconium acetate. The Li compound and the Zr compound are weighed and mixed with each other such that a ratio of Li/Zr is 2:1, and the resulting mixture is subjected to calcination at a temperature of 920 to 1200° C., whereby it is possible to produce the oxide of Li and Zr that has the above-specified crystallite size and forms a mixed phase having two or more phases.

Then, the oxide comprising at least Li and Mn as main components such as typically lithium manganate is mixed with the oxide comprising at least Li and Zr. The method of mixing these oxides is not particularly limited. For example, the oxides may be mixed with each other using a ball mil, a sand mill or a mix muller.

If the oxide of Li and Zr is prepared and added as an additive upon production of lithium manganate, and the resulting mixture is calcined, Li is incorporated into the obtained lithium manganate, so that the oxide of Li and Zr tends to be transformed into a Zr oxide such as $ZrO_2$. For this reason, in the present invention, it is required that the oxide comprising at least Li and Zr is mixed in the oxide comprising at least Li and Mn as main components such as typically lithium manganate.

Next, a positive electrode using a positive electrode active substance comprising the positive electrode active substance particles for non-aqueous electrolyte secondary batteries according to the present invention is described.

When producing the positive electrode comprising the positive electrode active substance particles according to the present invention, a conducting agent and a binder are added to and mixed with the positive electrode active substance particles by an ordinary method. Examples of the preferred conducting agent include acetylene black, carbon black and graphite. Examples of the preferred binder include polytetrafluoroethylene and polyvinylidene fluoride.

The secondary battery produced by using the positive electrode comprising the positive electrode active substance particles according to the present invention comprises the above positive electrode, a negative electrode and an electrolyte.

Examples of a negative electrode active substance which may be used in the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving, in addition to lithium phosphate hexafluoride, at least one lithium salt selected from the group consisting of lithium perchlorate and lithium borate tetrafluoride, etc., in the above solvent.

The non-aqueous electrolyte secondary battery produced by using the positive electrode comprising the positive electrode active substance particles according to the present invention has an improvement rate of a rate characteristic of not less than 1% and an improvement rate of a cycle characteristic of not less than 1% as evaluated by the below-mentioned method.

It is considered that by using the positive electrode active substance particles according to the present invention, there can be obtained not only the effect of enhancing an electron conductivity of the oxide of Li and Zr, but also the effect of suppressing deterioration of the positive electrode active substance owing to trapping of HF generated in the electrolyte solution. In addition, it is considered that since the oxide of Li and Zr is present not in the form of a core/shell structure but in bulk on a surface layer of the active substance particles, the ionic transport number between the bulk and interface of the positive electrode active substance is hardly deteriorated, and rather deterioration in electron conductivity and degradation owing to HF can be prevented, and therefore the obtained battery can be enhanced in rate characteristic and cycle characteristic.

EXAMPLES

In the following, the present invention is described in more detail by Examples. However, these Examples are only illustrative and not intended to limit the present invention thereto. The evaluation method used in the following Examples and Comparative Examples are as follows.

The composition of the particles was determined in the following manner. That is, 0.2 g of a sample was dissolved under heating in 25 mL of a 20% hydrochloric acid solution. The resulting solution was cooled and then charged into a 100 mL measuring flask together with pure water to prepare a sample solution. The resulting sample solution was subjected to the measurement using ICAP "SPS-4000" manufactured by Seiko Denshi Kogyo Co., Ltd., to quantitatively determine amounts of the respective elements therein.

The amount of Mn eluted was measured as follows. That is, in a glove box, 20 mL of an electrolyte solution (1 M $LiPF_6$/EC:DEC (3:7)) was added to 2 g of a sample, and the resulting solution was sealed and allowed to stand in a thermostat at 80° C. for 7 days. Then, a supernatant solution of the solution was subjected to extraction and filtration to measure the amount of Mn eluted using ICAP ["SPS-4000" manufactured by Seiko Electronics Industrial Co., Ltd.].

The X-ray diffraction of the sample was measured by "SmartLab" manufactured by Rigaku Co., Ltd., using Cu as a target at a 0.02° step scanning (holding time: 0.6 sec).

The crystallite size of the particles was calculated from the results of the above powder X-ray diffraction by a Rietveld method (using "RIETAN 2000").

The identification of a phase of the oxide of Li and Zr was calculated from the results of the above powder X-ray diffraction by an RIR method using PDXL (manufactured by Rigaku Co., Ltd.).

The average particle diameter D50 of the particles was measured by a wet laser method using a laser type particle size distribution measuring apparatus ["MICROTRACK HRA" manufactured by Nikkiso Co., Ltd.].

The positive electrode active substance particles according to the present invention were subjected to evaluation of battery characteristics using a 2032 type coin cell.

The coin cell used for the evaluation of battery characteristics was prepared as follows. That is, 92% by weight of a composite oxide as positive electrode active substance particles, 2.5% by weight of acetylene black and 2.5% by weight of a graphite both serving as a conducting material, and 3% by weight of polyvinylidene fluoride dissolved in N-methyl pyrrolidone as a binder, were mixed with each other, and then the resulting mixture was applied onto an Al metal foil and then dried at 120° C. The thus obtained sheets were each blanked into 14 mm$\phi$ and then compression-bonded together under a pressure of 1.5 t/cm$^2$, and the resulting sheet was used as a positive electrode. A metallic lithium having a thickness of 500 μm was blanked into 16 mm$\phi$ and used as a negative electrode, and 1 mol/L $LiPF_6$ solution of mixed solvent comprising EC and DEC in a volume ratio of 1:2 was used as an electrolyte solution, thereby producing a coin cell of a 2032 type.

The rate characteristic was determined as follows. That is, under the environmental condition of 25° C., the coin cell was charged at 0.1 C until reaching 4.3 V under CC-CV conditions, and then discharged until reaching 3.0 V under CC conditions (discharge capacity at this time was represented by (a)). Thereafter, the coin cell was charged at 0.1 C until reaching 4.3 V under CC-CV conditions, and then discharged at 10 C until reaching 3.0 V under CC conditions (discharge capacity at this time was represented by (b)). In the above case, the rate characteristic was defined by 100× (b)/(a).

In addition, the improvement rate of a rate characteristic of the coin cell was determined from the following formula:

Improvement rate of rate characteristic=$w-v$;

wherein v (%) is a rate characteristic of the coin cell to which the oxide of Li and Zr according to the present invention was not added (those coin cells of Reference Examples 1 and 2);

and w (%) is a rate characteristic of the coin cell to which the oxide of Li and Zr was adequately added, such as the coin cell according to the present invention.

The cycle characteristic was determined as follows. That is, under the environmental condition of 60° C., in the first cycle, the coin cell was charged at 1 C until reaching 4.3 V under CC-CV conditions, and then discharged until reaching 3.0 V under CC conditions (discharge capacity at this time was represented by (c)). Thereafter, the coin cell was charged at 1 C from 3.0 to 4.3 V under CC-CV conditions, and then discharged under CC conditions, followed by repeatedly subjecting the coin cell to charge/discharge cycles under the same conditions as described above until reaching 30th cycle. Then, in the 31st cycle, the coin cell was charged at 1 C until reaching 4.3 V under CC-CV conditions, and then discharged until reaching 3.0 V under CC conditions (discharge capacity at this time was represented by (d)). In the above case, the cycle characteristic was defined by 100×(d)/(c).

Also, the improvement rate of a cycle characteristic of the coin cell was determined from the following formula:

$$\text{Improvement rate of cycle characteristic} = y - x,$$

wherein x (%) is a cycle characteristic of the coin cell to which the oxide of Li and Zr according to the present invention was not added (those coin cells of Reference Examples 1 and 2); and y (%) is a cycle characteristic of the coin cell to which the oxide of Li and Zr was adequately added, such as the coin cell according to the present invention.

In the following, there are described Examples, etc., in which lithium manganate was used as an example of the oxide having a spinel structure and comprising Li and Mn as main components according to the present invention.

Reference Example 1

Production 1 of Lithium Manganate Particles

Under a nitrogen flow, 0.5 mol of manganese sulfate was added to 3.5 mol of sodium hydroxide to prepare a reaction solution having a total volume of 1 L. Manganese hydroxide thus produced was aged at 90° C. for 1 hr. After completion of the aging, air was passed through the reaction solution to oxidize manganese hydroxide at 90° C., and the resulting product was washed with water and then dried, thereby obtaining manganese oxide particles.

The above manganese oxide particles, lithium carbonate and aluminum hydroxide were mixed with each other using a ball mill for 1 hr such that a ratio of Li:Mn:Al was 1.07:1.83:0.10, thereby obtaining a uniform mixture. Fifty grams of the thus obtained mixture were placed in an alumina crucible, and held therein in atmospheric air at 960° C. for 3 hr, thereby obtaining lithium manganate particles.

As a result, it was confirmed that the amount of Mn eluted from the lithium manganate particles was 577 ppm, and the coin cell prepared using the positive electrode active substance comprising the lithium manganate particles had an initial discharge capacity of 105 mAh/g, a rate characteristic of 95.9%, and a cycle characteristic of 96.6%.

Production of Oxide of Li and Zr

Lithium carbonate and $ZrO_2$ (D50: 0.6 μm) were weighed at a ratio of Li/Zr=2:1, and mixed with each other in a mortar for 1 hr. The resulting mixture was calcined in atmospheric air at a temperature of each of 1000° C., 1200° C. and 1400° C. for 5 hr.

In the above case, as a result of XRD measurement of the oxide obtained by calcining the mixture at 1000° C. (refer to (a) in FIG. 1), it was confirmed that the main phase was $Li_2ZrO_3$, and $Li_6Zr_2O_7$ was present as the other phase, and the ratio of the main phase to the other phase was 97:3 as calculated by RIR method. Also, as a result of XRD measurement of the oxide obtained by calcining the mixture at 1200° C. (refer to (b) in FIG. 1), it was confirmed that the main phase was $Li_2ZrO_3$, and $Li_6Zr_2O_7$ was present as the other phase, and the ratio of the main phase to the other phase was 99:1 as calculated by RIR method. In addition, as a result of XRD measurement of the oxide obtained by calcining the mixture at 1400° C., it was confirmed that the main phase was $Li_2ZrO_3$, and no other phase was present.

Example 1

The oxide of Li and Zr obtained by calcining the mixture at 1000° C. was weighed in an amount of 1% by weight based on the lithium manganate obtained in Reference Example 1, and added to the lithium manganate. Both the particles were dry-mixed in a ball mill for 1 hr. As a result, it was confirmed that the amount of Mn eluted from the obtained lithium manganate particles was 423 ppm, and the coin cell prepared using the positive electrode active substance comprising the lithium manganate particles had a rate characteristic of 97.7%, and a cycle characteristic of 99.0%. Various properties of the thus obtained positive electrode active substance particles are shown in Table 1.

Example 2

The oxide of Li and Zr obtained by calcining the mixture at 1000° C. was weighed in an amount of 2% by weight based on the lithium manganate obtained in Reference Example 1, and added to the lithium manganate. Both the particles were dry-mixed in a ball mill for 1 hr. Various properties of the thus obtained positive electrode active substance particles are shown in Table 1.

Example 3

The oxide of Li and Zr obtained by calcining the mixture at 1000° C. was weighed in an amount of 4% by weight based on the lithium manganate obtained in Reference Example 1, and added to the lithium manganate. Both the particles were dry-mixed in a ball mill for 1 hr. Various properties of the thus obtained positive electrode active substance particles are shown in Table 1.

Example 4

The oxide of Li and Zr obtained by calcining the mixture at 1200° C. was weighed in an amount of 2% by weight based on the lithium manganate obtained in Reference Example 1, and added to the lithium manganate. Both the particles were dry-mixed in a ball mill for 1 hr. Various properties of the thus obtained positive electrode active substance particles are shown in Table 1.

Comparative Example 1

The oxide of Li and Zr obtained by calcining the mixture at 1000° C. was weighed in an amount of 6% by weight based on the lithium manganate obtained in Reference Example 1, and added to the lithium manganate. Both the particles were dry-mixed in a ball mill for 1 hr. Various properties of the thus obtained positive electrode active substance particles are shown in Table 1.

Comparative Example 2

The oxide of Li and Zr obtained by calcining the mixture at 1400° C. was weighed in an amount of 2% by weight based on the lithium manganate obtained in Reference Example 1, and added to the lithium manganate. Both the particles were dry-mixed in a ball mill for 1 hr. Various properties of the thus obtained positive electrode active substance particles are shown in Table 1.

Comparative Example 3

$ZrO_2$ (D50: 0.6 μm) was added in an amount of 1% by weight to the lithium manganate obtained in Reference Example 1. Various properties of the thus obtained positive electrode active substance particles are shown in Table 1.

Reference Example 2

Production 2 of Lithium Manganate Particles

Under a nitrogen flow, 0.5 mol of manganese sulfate was added to 3.5 mol of sodium hydroxide to prepare a reaction solution having a total volume of 1 L. Manganese hydroxide thus produced was aged at 90° C. for 1 hr. After completion of the aging, air was passed through the reaction solution to oxidize manganese hydroxide at 90° C., and the resulting product was washed with water and then dried, thereby obtaining manganese oxide particles.

The above manganese oxide particles, lithium carbonate and magnesium oxide were mixed with each other using a ball mill for 1 hr such that a ratio of Li:Mn:Mg was 1.07:1.88:0.05, thereby obtaining a uniform mixture. Fifty grams of the thus obtained mixture were placed in an alumina crucible, and held therein in atmospheric air at 870° C. for 3 hr, thereby obtaining lithium manganate particles.

As a result, it was confirmed that the coin cell prepared using the positive electrode active substance comprising the thus obtained lithium manganate particles had an initial discharge capacity of 107 mAh/g, a rate characteristic of 94.8%, and a cycle characteristic of 95.7%.

Example 5

The oxide of Li and Zr obtained by calcining the mixture at 1000° C. was weighed in an amount of 2% by weight based on the lithium manganate obtained in Reference Example 2, and added to the lithium manganate. Both the particles were dry-mixed in a ball mill for 1 hr.

As a result, it was confirmed that the coin cell prepared using the positive electrode active substance comprising the thus obtained lithium manganate particles had a rate characteristic of 97.1%, and a cycle characteristic of 97.1%. Various properties of the thus obtained positive electrode active substance particles are shown in Table 1.

Comparative Example 4

The oxide of Li and Zr obtained by calcining the mixture at 1200° C. was weighed in an amount of 6% by weight based on the lithium manganate obtained in Reference Example 2, and added to the lithium manganate. Both the particles were dry-mixed in a ball mill for 1 hr. Various properties of the thus obtained positive electrode active substance particles are shown in Table 1.

TABLE 1

| | Kind of LMO | | |
|---|---|---|---|
| | Chemical formula | Kind of substituting element | Amount of LZO added (wt %) |
| Reference Example 1 | $Li_{1.07}Mn_{1.83}Al_{0.10}O_4$ | Al | 0 |
| Example 1 | $Li_{1.07}Mn_{1.83}Al_{0.10}O_4$ | Al | 1 |
| Example 2 | $Li_{1.07}Mn_{1.83}Al_{0.10}O_4$ | Al | 2 |
| Example 3 | $Li_{1.07}Mn_{1.83}Al_{0.10}O_4$ | Al | 4 |
| Example 4 | $Li_{1.07}Mn_{1.83}Al_{0.10}O_4$ | Al | 2 |
| Comparative Example 1 | $Li_{1.07}Mn_{1.83}Al_{0.10}O_4$ | Al | 6 |
| Comparative Example 2 | $Li_{1.07}Mn_{1.83}Al_{0.10}O_4$ | Al | 2 |
| Comparative Example 3 | $Li_{1.07}Mn_{1.83}Al_{0.10}O_4$ | Al | $ZrO_2$: 1 wt % |
| Reference Example 2 | $Li_{1.07}Mn_{1.88}Mg_{0.05}O_4$ | Mg | 0 |
| Example 5 | $Li_{1.07}Mn_{1.88}Mg_{0.05}O_4$ | Mg | 2 |
| Comparative Example 4 | $Li_{1.07}Mn_{1.88}Mg_{0.05}O_4$ | Mg | 6 |

| | Kind of LMO | | | |
|---|---|---|---|---|
| | Ratio of $Li_2ZrO_3$ phase in LZO (%) | Ratio of phase other than $Li_2ZrO_3$ in LZO (%) | Crystallite size of LZO (nm) | Amount of Mn eluted (ppm) |
| Reference Example 1 | — | — | — | 577 |
| Example 1 | 97 | 3 | 369 | 423 |
| Example 2 | 97 | 3 | 369 | 380 |
| Example 3 | 97 | 3 | 369 | 511 |
| Example 4 | 99 | 1 | 318 | 443 |
| Comparative Example 1 | 97 | 3 | 369 | 956 |
| Comparative Example 2 | 100 | 0 | 812 | 678 |
| Comparative Example 3 | — | — | — | 801 |
| Reference Example 2 | — | — | — | — |
| Example 5 | 97 | 3 | 369 | — |
| Comparative Example 4 | 97 | 3 | 369 | — |

| | Battery characteristics | |
|---|---|---|
| | Rate characteristic (%) | Improvement rate of rate characteristic (difference from that of Example) (%) |
| Reference Example 1 | 95.9 | — |
| Example 1 | 97.7 | 1.8 |
| Example 2 | 98.3 | 2.4 |
| Example 3 | 97.6 | 1.6 |
| Example 4 | 97.2 | 1.2 |
| Comparative Example 1 | 95.9 | 0.0 |
| Comparative Example 2 | 95.9 | 0.0 |
| Comparative Example 3 | 96.7 | 0.8 |
| Reference Example 2 | 94.8 | — |
| Example 5 | 97.1 | 2.3 |
| Comparative Example 4 | 95.2 | 0.4 |

TABLE 1-continued

| | Battery characteristics | |
|---|---|---|
| | Cycle retention rate (%) | Improvement rate of cycle characteristic (difference from that of Example) (%) |
| Reference Example 1 | 96.6 | — |
| Example 1 | 99.0 | 2.4 |
| Example 2 | 98.5 | 2.0 |
| Example 3 | 98.0 | 1.4 |
| Example 4 | 97.9 | 1.3 |
| Comparative Example 1 | 98.7 | 2.1 |
| Comparative Example 2 | 96.9 | 0.3 |
| Comparative Example 3 | 92.8 | −3.7 |
| Reference Example 2 | 95.7 | — |
| Example 5 | 97.1 | 1.4 |
| Comparative Example 4 | 96.2 | 0.5 |

Figure 1:
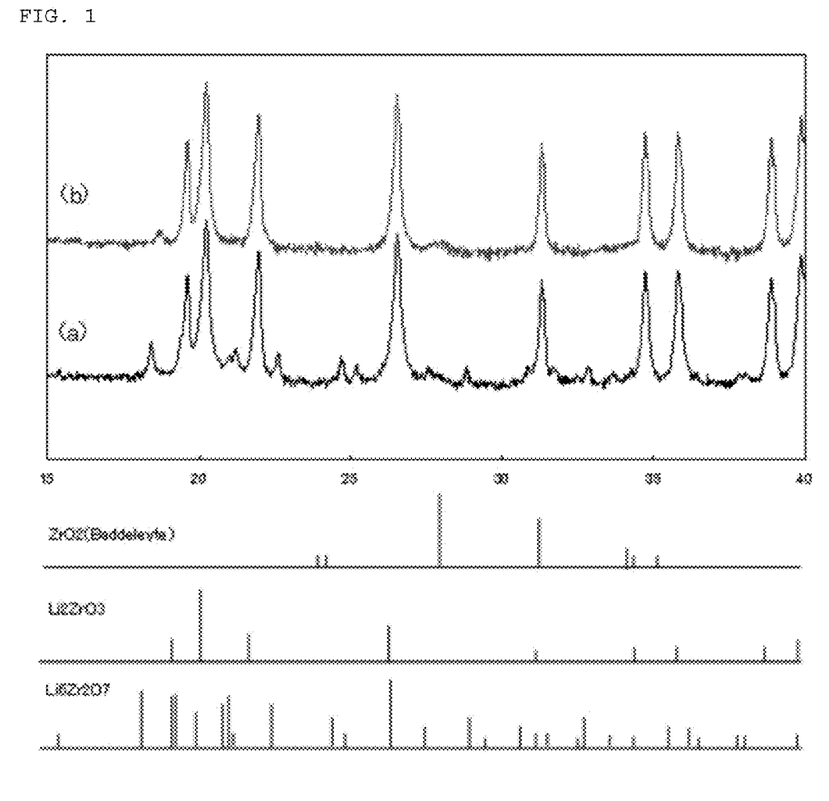
FIG. 1 is an XRD diffraction pattern of an oxide of Li and Zr synthesized in Examples (in which (a) shows a product obtained by calcination at 1000° C., and (b) shows a product obtained by calcination at 1200° C.)
Figure 2:
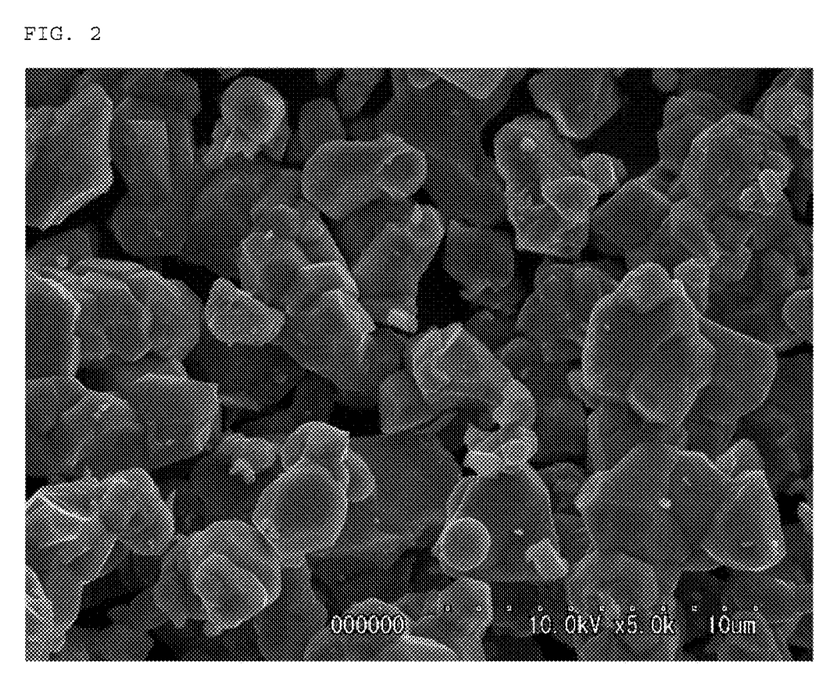
FIG. 2 is a scanning electron micrograph of positive electrode active substance particles obtained in Example 1.

FIG. 1 shows a scanning electron micrograph of the positive electrode active substance particles obtained in Example 1. As apparently recognized from FIG. 1, it was confirmed that the lithium manganate particles and the oxide of Li and Zr were independently present in the positive electrode active substance particles obtained in Example 1 (having neither a core/shell structure nor an island structure).

Owing to the above configuration of presence of the oxide of Li and Zr, it is considered that the resulting battery is free from deterioration in transport number of Li ions upon transfer of Li, but can also be enhanced in electron conductivity by the presence of contact points between the oxide of Li and Zr and the lithium manganate particles.

INDUSTRIAL APPLICABILITY

The positive electrode active substance particles for non-aqueous electrolyte secondary batteries according to the present invention can provide a battery that is capable of trapping HF and improving an electron conductivity, and therefore can be suitably used as a positive electrode active substance for secondary batteries having a high rate characteristic and an excellent cycle characteristic.

The invention claimed is:

1. Positive electrode active substance particles for a non-aqueous electrolyte secondary battery, comprising:
   an oxide having a spinel structure and comprising at least Li and Mn; and
   an oxide comprising at least Li and Zr,
   wherein the oxide comprising at least Li and Zr forms a mixed phase comprising two or more phases, and a content of the oxide comprising at least Li and Zr in the positive electrode active substance particles is 0.1 to 4% by weight, and
   wherein the mixed phase of the oxide comprising at least Li and Zr comprises (i) a first phase comprising $Li_2ZrO_3$ and (ii) a second phase comprising at least one other phase selected from the group consisting of $Li_4ZrO_4$, $Li_6Zr_2O_7$ and $Li_8ZrO_6$, and a ratio of the first phase to the second phase in the mixed phase is 99:1 to 92:8.

2. The positive electrode active substance particles for a non-aqueous electrolyte secondary battery according to claim 1, wherein the oxide comprising at least Li and Zr has a crystallite size of 100 to 600 nm.

3. A process for producing the positive electrode active substance particles for non aqueous electrolyte secondary batteries a non-aqueous electrolyte secondary battery as claimed in claim 1, comprising the steps of:
   mixing the lithium/manganese composite oxide having a spinel structure and comprising at least Li and Mn with 0.1 to 4% by weight of the oxide comprising at least Li and Zr.

4. A non-aqueous electrolyte secondary battery using the positive electrode active substance particles as claimed in claim 1.

* * * * *